(12) United States Patent
Morris et al.

(10) Patent No.: US 9,418,265 B2
(45) Date of Patent: Aug. 16, 2016

(54) RFID READER HAVING AN ARRAY OF ANTENNAS

(71) Applicant: CRYOGATT SYSTEMS LIMITED, Buxted (GB)

(72) Inventors: Geoffrey Morris, Pinner (GB); James Douglas, Kings Langley (GB)

(73) Assignee: Cryogatt Systems Limited, Buxted Sussex (GB)

( * ) Notice: Subject to any disclaimer, the term of this patent is extended or adjusted under 35 U.S.C. 154(b) by 0 days.

(21) Appl. No.: 14/411,189

(22) PCT Filed: Jul. 5, 2013

(86) PCT No.: PCT/GB2013/051785
§ 371 (c)(1),
(2) Date: Dec. 24, 2014

(87) PCT Pub. No.: WO2014/006417
PCT Pub. Date: Jan. 9, 2014

(65) Prior Publication Data
US 2015/0122887 A1    May 7, 2015

(30) Foreign Application Priority Data
Jul. 5, 2012    (GB) .................................... 1212040.8

(51) Int. Cl.
*G06K 7/00*    (2006.01)
*G06K 7/10*    (2006.01)

(52) U.S. Cl.
CPC ........ *G06K 7/10356* (2013.01); *G06K 7/10336* (2013.01)

(58) Field of Classification Search
CPC ....... H01Q 3/26; H01Q 22/25; G06K 7/0004; G06K 7/084; G06K 19/077; B42D 15/10
USPC .................... 343/878; 340/10.1; 235/440, 488
See application file for complete search history.

(56) References Cited

U.S. PATENT DOCUMENTS

| | | | |
|---|---|---|---|
| 8,197,750 | B2 | 6/2012 | Trueeb et al. |
| 2004/0100413 | A1 | 5/2004 | Waldner |
| 2005/0247782 | A1 | 11/2005 | Ambartsoumian |
| 2006/0187051 | A1 | 8/2006 | Wu et al. |

(Continued)

FOREIGN PATENT DOCUMENTS

| | | |
|---|---|---|
| EP | 2 315 163 A1 | 4/2011 |
| GB | 2 450 531 A | 12/2008 |

(Continued)

OTHER PUBLICATIONS

IVF Witness document, Research Instruments Ltd. (Applicant became aware of this document in 2004).

(Continued)

*Primary Examiner* — Karl D Frech
(74) *Attorney, Agent, or Firm* — Kilpatrick Townsend & Stockton LLP (57) ABSTRACT

An RFID reader for tracking a plurality of RFID tags, the RFID reader comprising an array of multilayer antennas each multilayer antenna comprising a first coil and a second coil, the first coil being superimposed above the second coil; and an electronics unit configured to transmit a signal to and receive and process information from each multilayer antenna.

20 Claims, 5 Drawing Sheets

(56) References Cited

U.S. PATENT DOCUMENTS

| | | | |
|---|---|---|---|
| 2008/0106484 A1* | 5/2008 | Navarro | H01Q 3/26 343/878 |
| 2008/0150693 A1 | 6/2008 | You et al. | |
| 2010/0090802 A1* | 4/2010 | Nilsson | H01Q 1/2225 340/10.1 |
| 2010/0302040 A1 | 12/2010 | Davidowitz | |
| 2011/0199187 A1 | 8/2011 | Davidowitz | |

FOREIGN PATENT DOCUMENTS

| | | |
|---|---|---|
| JP | 2005-339507 A | 12/2005 |
| WO | 01/43056 A1 | 6/2001 |
| WO | 2005/109332 A1 | 11/2005 |
| WO | 2005/115621 A1 | 12/2005 |
| WO | 2007/024540 A1 | 3/2007 |
| WO | 2008/014117 A2 | 1/2008 |
| WO | 2009/004366 A1 | 1/2009 |

OTHER PUBLICATIONS

International Search Report corresponding to the PCT/GB2013/051785 application filed Jul. 5, 2013.

* cited by examiner

RFID READER HAVING AN ARRAY OF ANTENNAS

CROSS-REFERENCE TO RELATED APPLICATIONS

This application is a U.S. National Stage of PCT Application No. PCT/GB2013/051785, filed Jul. 5, 2013, which claims priority to Foreign Application No. 1212040.8 GB, filed Jul. 5, 2012, the entire contents of each of which are incorporated herein by reference in their entirety for all purposes.

TECHNICAL FIELD

The present invention relates to a reader for RFID tracking, particularly RFID tracking of biological material stored in vials at low temperatures (e.g. temperatures of below $-130°$ C.)

BACKGROUND

Biological samples may be preserved by cryogenic freezing. The biological samples are usually stored in disposable containers (disposables). The shape of the disposable container used depends on the type of sample. Examples of commonly used disposable containers include vials, straws and bags. The disposable container is stored at low temperatures in a Dewar flask, usually filled with liquid nitrogen at a temperature of $-196°$ C.

Stored biological samples can be identified by writing on the disposable containers themselves, or by labels stuck to the containers. These labels may be handwritten or printed and can include bar codes. However, these methods of identification have associated disadvantages; written notes on containers can easily be erased or smudged and labels containing handwritten notes and printed text or barcode information can fall off the disposable containers while they are stored inside the Dewar leading to unidentifiable samples. These problems are exacerbated by the cold conditions in which biological samples must be kept.

When performing an audit of biological samples stored in cold storage (at temperatures of $-196°$ C.), the samples should not be allowed to warm up to a temperature greater than $-130°$ C. It is therefore desirable to minimise the amount of time spent outside of the Dewar wherever possible.

Recording, monitoring and auditing of samples in cold storage takes a considerable amount of time and effort, even when samples are labelled using barcodes. An additional and undesirable increase in the time taken to record or audit samples arises as a result of frost which forms on the surfaces of disposable containers and their labels when they are removed from liquid nitrogen into relatively warmer temperatures. It is common for samples to be stored for many years (e.g. 15 years) but even after just one year in storage, the layer of frost which builds up on a disposable container can make it impossible to make an optical reading of a bar code on a label using a bar code reader because a layer of frost blocks or diffracts the light of the bar code reader. The container cannot be warmed up to remove frost as this would lead to destruction of the sample. The frost can be wiped off the disposable container but this contributes to an undesirable increase in the amount of time taken to read the sample.

Where biological samples are stored in vials, it is common practice for multiple vials to be stored together in standardized boxes. Standardised boxes may have spaces for 100 vials in a 10×10 array or for 169 vials in a 13×13 array. It is also common, in a laboratory situation, for vials to be stored in a "test tube" rack having a 4×10 configuration. Many other configurations of n×m arrays exist. For example, a 3×3 array is often used for larger vials.

Commonly used sizes of vials include a diameter of 10 mm and a diameter of 12 mm although the diameter of the vial can be larger e.g. 25 mm.

It is known that Radio Frequency ID (RFID) tags can be used to monitor a plurality of vials stored at low temperatures of down to $-196°$ C. An RFID reader can be used to write information to and read information from the RFID tag before, after, or during cryogenic storage.

An RFID tag includes an RF transmitter and an RF receiver. An RFID reader can be used to transmit an encoded radio signal to a tag to interrogate it. Upon receiving the interrogation signal, the RFID tag transmits its identification information to the reader. This identification information may be a unique serial number assigned to a particular patient or a particular sample.

In Europe and other countries outside of the US, RFID components for medical storage operate at an approved frequency of 13.56 MHz. It is important that the frequency used for the RFID tag does not lead to any undesirable interference with other electronic medical equipment. Lower medically approved frequency bands such as 125 KHz do not provide enough signal bandwidth to provide the tag with a useful user defined memory.

GB2456531 and EP2165287 disclose a monitoring system for monitoring a plurality of vials having RFID tags which work at frequencies of 13.56 MHz. Using the system described in these documents it is possible to associate an RFID tag on a vial with a particular box. However, it is not possible to monitor the exact location of the specific vial within the box.

STATEMENT OF INVENTION

Accordingly, the present invention aims to solve the above problems by providing an RFID reader according to claim 1.

In this way, the RFID reader can be used to interrogate a plurality of RFID tags in a single reading session.

An array of vials can be placed on top of the reader so that each vial in the box/array of vials can be brought into alignment with an antenna. Each antenna is configured to work over a confined range approximately equal to the spacing of the vials so that it only interacts with the designated vial that it is aligned with and does not interfere with adjacent vials. The range of each multilayer antenna is preferably 0-5 mm.

As each vial is read by an individual antenna, it is possible to take a reading of the exact location of each disposable in a quick and more reliable way.

A multi-layer antenna contains more turns per unit area than a single layer antenna. This increase in the number of turns leads to an increase in the field intensity of the field generated by the antenna.

Preferably, the array of multilayer antennas includes Radar Absorbent Material (RAM).

In this way, the RAM is used to compensate for the variation in inductance which arises due to the varying distance between each antenna and the RF circuit of the electronics unit. The aim of the RAM compensation is to achieve a similar resonance and performance at each antenna along the row so that each antenna presents (approximately) the same inductance to the RF circuit. A single tuning capacitor can then be used to optimise all antennas in a strip. The single tuning capacitor is optimised to value that best tunes up all of the antennas in the strip and is then fixed at this optimised value. This feature of one "fixed" capacitor for all antennas of the strip advantageously reduces cost and simplifies setup as compared to an alternative embodiment in which there is a separate variable capacitor per antenna.

The RAM may be ferrite.

The amount of RAM is preferably varied so that it decreases with increasing distance from the electronics unit.

The RAM is preferably discs of Radar Absorbent Material.

The outer diameter of each antenna is preferably 25 mm or less and even more preferably 12 mm or less. In this way, the array of antennas is configured to interact with RFID tags having a diameter of 10 mm or less.

The array of multilayer antennas preferably includes a strip of antennas including 10 antennas arranged in a 1×10 strip.

The RFID reader preferably comprises 9 additional 1×10 strips of antennas to form a 10×10 array, each 10×1 strip of antennas having a separate electronics unit such that the 10 strips of antennas are operable in parallel. In this way, the amount of time taken to read all of the vials in the 10×10 box is reduced.

Optionally, the strip of antennas includes 13 antennas connected to one another in a 1×13 array.

Optionally, the RFID reader further comprises 12 additional strips of antennas, each strip of antennas having a separate electronics unit such that the 13 strips of antennas are operable in parallel.

Preferably, the centre-to-centre spacing of adjacent antennas is no more than 13 mm for a 10×10 array and no more than 10 mm for a 13×13 array. Even more preferably, the centre-to-centre spacing of adjacent antennas is no more than 12.8 mm for a 10×10 array and no more than 9.9 mm for a 13×13 array.

Optionally, the RFID reader may include 4 strips of 10 antennas to form a 4×10 array, each strip of antennas having a separate electronics unit such that the 4 strips of antennas are operable in parallel. In this way, the array is configured to interact with a standard 4×10 "test tube" rack of vials used in a laboratory.

For a 4×10 array, the maximum centre-to-centre spacing of adjacent antennas along the longitudinal direction of a strip is 2 cm and the maximum centre-to-centre spacing of adjacent antennas along the direction transverse to the longitudinal direction is 3 cm.

An RFID reader of any size may include a receiving surface configured to receive a box containing vials. Alternatively, the RFID reader of any size may include a plurality of slots, each slot configured to receive a vial.

The present invention will now be disclosed by way of example only, with reference to the accompanying figures, in which.

DETAILED DESCRIPTION

Figure 1:
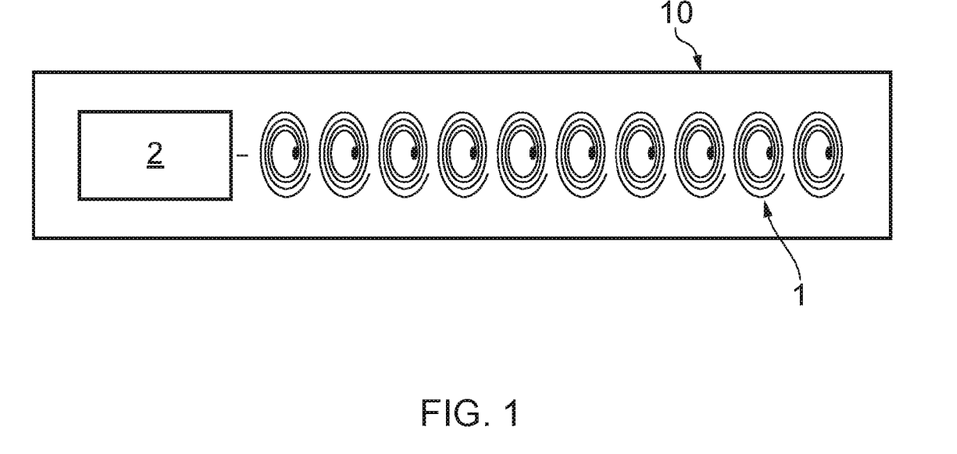
FIG. 1 is a schematic diagram of a first embodiment of an RFID reader.

A first embodiment of an RFID reader, 10 according to the present invention is shown in FIG. 1. A strip (row) of 10 multilayer antennas 1 forms a 1×10 array. The multilayer antennas are connected to one another in parallel (see FIG. 3) so that each multilayer antenna is connected to an electronics unit 2 via at least one switch. The electronics unit controls the writing of information to and the reading of information from RFID tags.

Each antenna 1 is configured to interact on a one-to-one basis with an RFID tagged vial via inductive coupling. The RFID reader may be configured only to read each of a plurality of tagged vials or alternatively may be configured to both read and write to each of a plurality of tagged vials.

To read each of a plurality of vials placed in proximity to the RFID reader 10, an interrogation command signal is sent from the reader to the individual RFID tagged vial via its dedicated multilayer antenna.

In the case where the RFID reader can also be used to program (write to) the RFID tags, when writing to each of the RFID tags, the signal sent to the RFID tag via its designated antenna includes a write command is sent that enables the RFID tag to be programmed (in its user memory) with information such as a unique identifier.

Each multilayer antenna of this first embodiment is made up of a first antenna layer of a first coil 43a having 4 turns and a second antenna layer (not shown) of a second coil 43b having 4 turns. In use, the first coil is positioned directly above the second coil. The first layer is connected to the second layer in series to give a multilayer antenna with a total of 8 turns.

Figure 2:
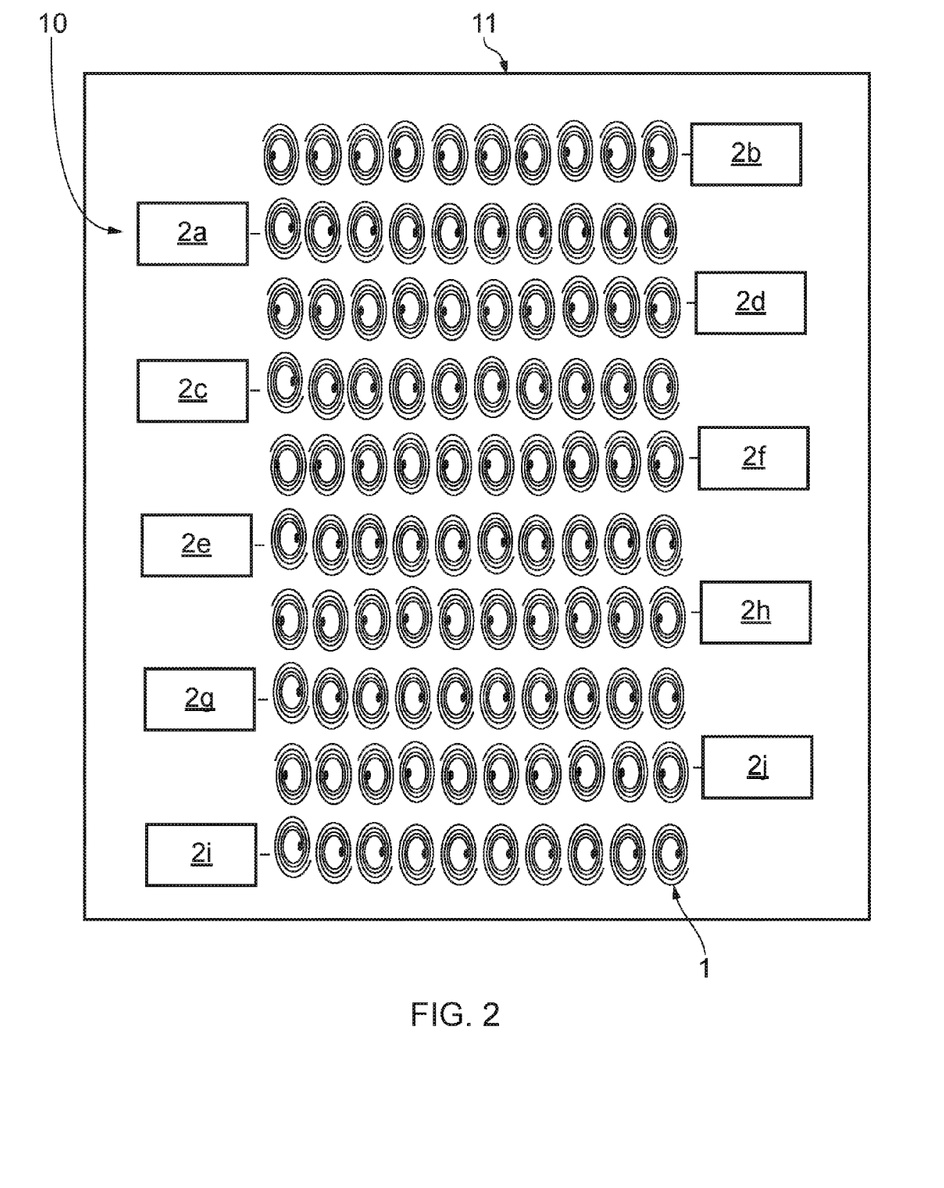
FIG. 2 is a schematic diagram of a second embodiment of an RFID reader.

A second embodiment of the RFID reader of the present invention is shown in FIG. 2. In this second embodiment the RFID reader 11 is made up of 10 of the 1×10 strips of the first embodiment. Each 1×10 strip of the 10×10 array has its own electronics unit 2a-2j. The RFID reader is therefore capable of operating all 10 strips in parallel.

The 1×10 strips are arranged so that the antennas are aligned in a 10×10 array. The strips lie in alternate directions in a "top and tail" arrangement so that half of the 1×10 strips have an electronic unit 2a, 2c, 2e, 2g, 2i located at a first side of the 10×10 array and the other half of the 1×10 strips have an electronic unit 2b, 2d, 2f, 2h, 2j located at a second side of the 10×10 array which is at the opposite end of the array to the first side.

Figure 3:
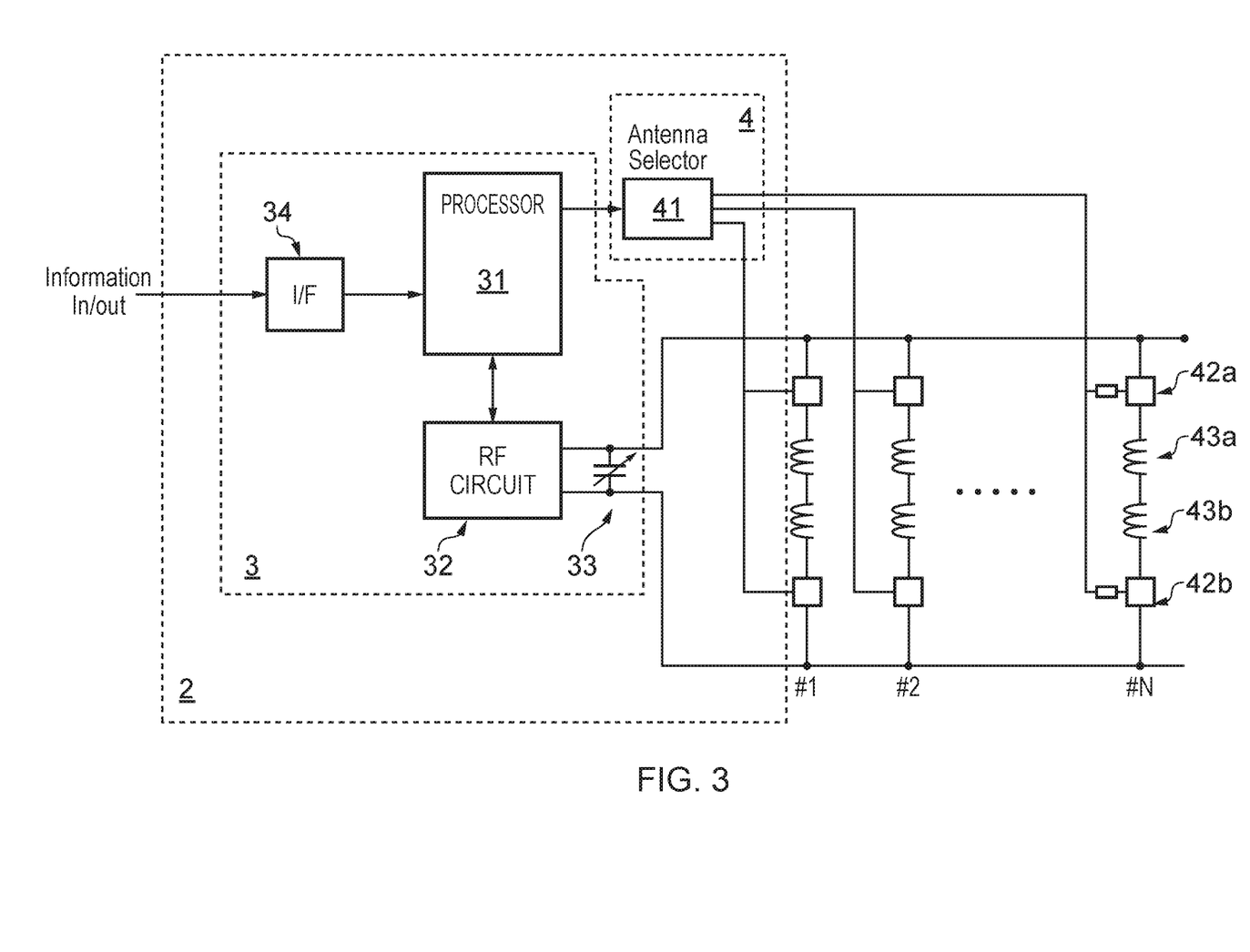
FIG. 3 is a schematic circuit diagram of the RFID reader of FIG. 1.

FIG. 3 shows an example circuit for the electronics unit 2, 2a-2j of the box reader 10 of FIG. 1 and for electronics unit for each strip of antennas of the box reader 11 of FIG. 2. Each strip of antennas in FIG. 2 has its own dedicated electronics unit 2a-2j.

Each electronics unit 2, 2a-2j is made up of reader circuitry 3 concerned with the processing of information being written to or read from an RFID tag via a multilayer antenna, and router circuitry 4 which selects the required antenna.

The reader circuitry 3 includes a processor 31, an RF circuit 32 and an antenna tuning capacitor 33.

A communications interface I/F 34 provides a means by which the RFID reader 10 can communicate with other equipment such as a personal computer or laptop. Commands sent from other equipment to read/write information from/to the RFID tags are sent to the processor via the communications interface.

The RF circuit 32 is connected to the processor such that command signals can be sent from the processor 31 to the RF circuit 32 to instruct the RF circuit to perform the necessary operations to affect a required read or write operation.

In use, the RF circuit 32 is capable of sending read and/or write signals to each of the multilayer antennas via the antenna tuning capacitor 33. The multilayer antennas 1 are connected in parallel and a MOSFET switch is positioned between each coil 43a, 43b of a multilayer antenna 1 and the antenna tuning capacitor 33.

The antenna tuning capacitor 33 of the electronics unit is located at one end of the 1×10 strip of antennas which means that the distance between the antenna tuning capacitor 33 and the multilayer antenna 1 is different for each antenna of the strip.

The reader circuitry 3 of a strip is only connected to one multilayer antenna 1 of that strip at any given time. The processor 31 informs the antenna selector 41 of the identity of the antenna corresponding to the required RFID tag. The antenna selector 41 selects the desired multilayer antenna by switching the MOSFET switches 42a, 42b associated with the first coil 43a and second coil 43b of the relevant multilayer antenna.

When the antenna MOSFET switches on the coil 43a, 43b associated with the required antenna 1 it turns off the MOSFET switches associated with all other antennas in the strip (row).

A combination of different readers of differing sizes can be used in a laboratory. For example, the unique identifier for each vial could be programmed using a 1×10 test tube reader that is located in the laboratory. Vials could then be stored in a 10×10 box and a different reader e.g. 10×10 box reader configured only to read the vials could be used to carry out auditing/tracking of the vials stored in the 10×10 box.

Figure 4:
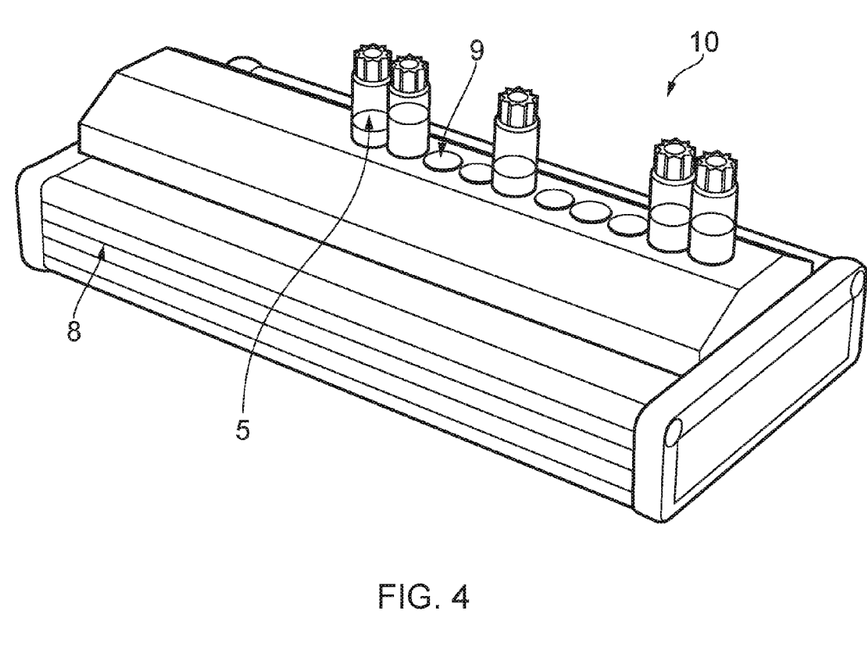
FIG. 4 is a schematic diagram of the RFID reader of FIG. 1 including an external housing.

FIG. 4 shows a 1×10 reader such as that of FIG. 1 encased in an outer housing 8. The outer housing includes slots 9 into which vials can be placed.

Figure 5A:
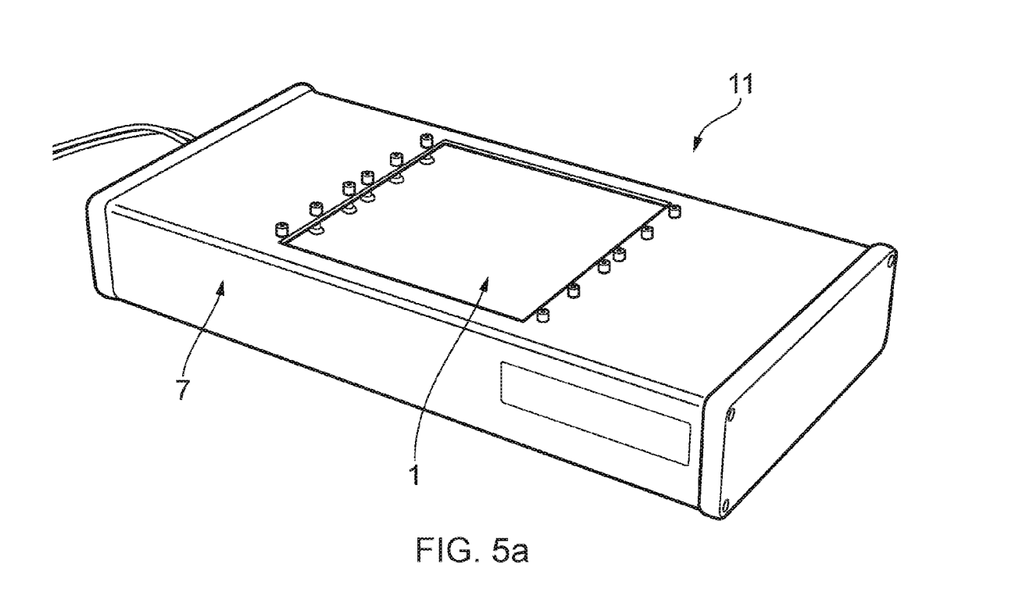
FIG. 5 is a schematic diagram of the RFID reader of FIG. 2 in including an external housing.
Figure 5B:
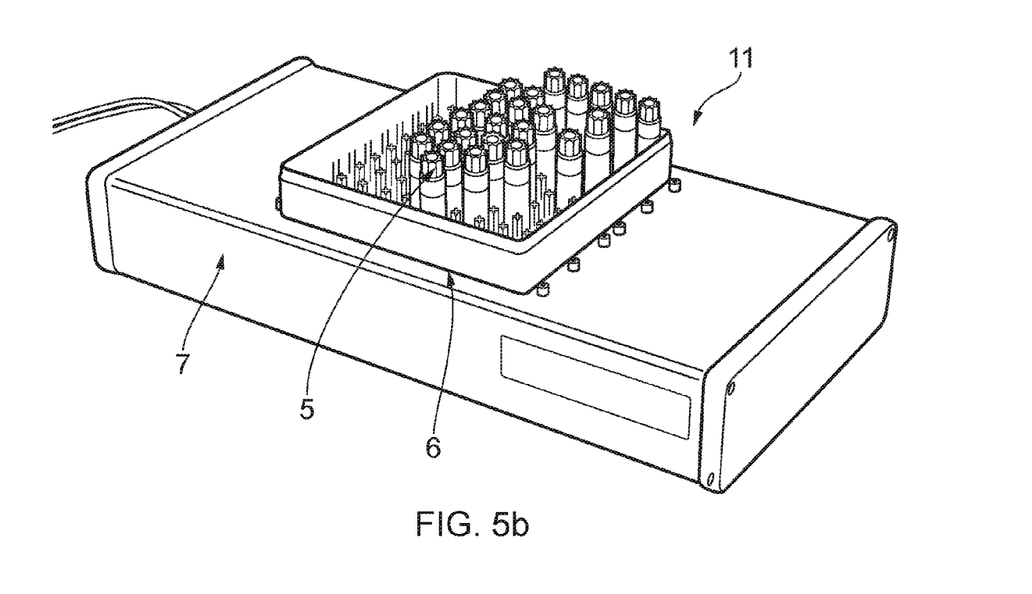

FIG. 5a shows a 10×10 reader 11, such as that of FIG. 2, encased in a housing 7. The top PCB including the first coils of multilayer antennas 1 is visible. A box 6 of vials 5 can be directly placed on the PCB as shown in FIG. 5b. Preferably, the outer housing also includes a tray or cover (not shown) to cover the PCB and hermetically seal the housing therefore preventing condensation from entering the outer casing. Alternatively, the outer housing can be one complete and continuous enclosure which hermetically seals all of the electronics of the reader.

The outer housing shown is preferably constructed of a material capable of withstanding cold temperatures such polypropylene or polyethylene. The reading of boxes can therefore be undertaken with the reader lowered into a Dewar for timescales of up to 20 minutes.

The RFID reader preferably includes 4 PCB layers: a top outer PCB layer; a bottom outer PCB layer; and a top inner PCB layer; and a bottom inner PCB layer.

The first coil 43a of the multilayer antenna 1 is preferably located at a top outer PCB layer, the second coil 43b of the multilayer antenna is preferably located at a bottom outer PCB layer, and the two inner PCB layers form the driving circuit. The inner layers provide bus connections that distribute the RF signal to the MOSFET switches.

There is at least one MOSFET switch per multilayer antenna. Preferably, there are two MOSFET switches per multilayer antenna; a first MOSFET switch to connect the first coil to an RF bus and a second MOSFET switch to connect the second coil to an RF bus. Interlayer connections through the PCB layers allow the MOSFET switches for both the upper and lower coils to be physically located on the bottom outer PCB layer. This means that the top outer PCB layer can be left flat without components in order to provide a better surface for receiving a flat base of a vial box.

PCB track is preferably used to connect each antenna to the RF circuit (via the MOSFET switches). The PCB track contributes a significant series inductance which increases with distance between the antenna and the RF circuit. This inductance causes significant variations in the resonance and performance of the strip of antennas. Radar Absorbent Material (RAM) can be used to compensate for this inductance. The RAM is preferably attached to the bottom PCB outer layer on its outer face.

The RAM may be discs of Radar Absorbent Material in which case the variation in the amount of RAM can be achieved using a plurality of discs of different thicknesses. In this case, the thickest disc should be located at the multilayer antenna closest to the RF circuit of the electronics unit and the thinnest disc furthest away from the RF circuit of the electronics unit. Each circular disc of RAM is preferably located directly on the second coil (i.e. the lower coil) of the designated multilayer antenna on the underside of the PCB. In this way it is possible to obtain a similar resonance and performance at each antenna.

In a preferable arrangement of RAM for the 1×10 array of FIG. 1 or for each of the 1×10 strips in the 10×10 arrangement of FIG. 2, the first four antennas at the "electronics end" have a RAM disc fitted; the remaining 6 antennas of each strip have no RAM fitted. All RAM discs preferably have an 8 mm diameter with the thickness profile of 2.5 mm for the antenna closest to the electronics unit and also 2.5 mm for the antenna second closest, 2.0 mm for the antenna third closest and, 1.5 mm for the antenna fourth closest to the electronics module.

Alternatively, the variation in the amount of RAM may be achieved by varying the diameter of the discs. In this case the disc with the largest diameter should be located at the antenna closest to the RF circuit of the electronics unit and the disc with the smallest diameter should be located furthest away from the RF circuit of the electronics unit.

In a further alternative, strips of RAM can be used. The strips of RAM are preferably triangular shaped so that they taper from a greater width to a narrower width with increasing distance from the RF circuit of the electronics unit.

Where the RFID reader contains multiple strips of antennas, the electronic units of each strip of antennas are preferably synchronised to work in parallel with each other.

Where the strips are arranged in a "top and tail arrangement", the electronic units are preferably synchronised such that for each strip, the sequence of switching starts with the antenna closest to the electronic unit and works through each antenna in turn finishing with the antenna furthest away from the electronic unit. In this way the activation of side-by-side antennas is avoided so that the risk of mutual coupling/cross reading is minimised.

The RFID tag and corresponding antenna 1 preferably work at frequencies of 13.56 MHz which corresponds to an ISO 18000 standard of −3.

The reader module can, for example, be a custom ISO15693 IBT RFID reader module.

The foregoing description of the preferred embodiments of the invention have been presented for purposes of illustration and description, it is not intended to be exhaustive or to limit the invention to the precise form disclosed, and modifications and variations are possible in light of the above teachings.

For example, although specific sizes of arrays of antennas have been described above, the RFID reader of the present invention can include any array of n×m antennas where n is the number of strips and m is the number of antennas per strip.

It is intended that the scope of the invention be defined by the claims appended hereto.

The invention claimed is:

1. An RFID reader for tracking a plurality of RFID tags, the RFID reader comprising:
   an array of multilayer antennas, each multilayer antenna in the array of multilayer antennas comprising a first coil and a second coil, the first coil being superimposed above the second coil; and an electronics unit configured to transmit a signal to and receive and process information from each multilayer antenna in the array of multilayer antennas.

2. The RFID reader of claim 1, wherein the RFID reader includes Radar Absorbent Material (RAM).

3. The RFID reader of claim 2, wherein the Radar Absorbent Material is located directly on the second coil.

4. The RFID reader of claim 2, wherein an amount of Radar Absorbent Material is varied so that it decreases with increasing distance from the electronics unit.

5. The RFID reader of claim 2, wherein the Radar Absorbent Material comprises discs of Radar Absorbent Material.

6. The RFID reader of claim 1, wherein an outer diameter of each antenna in the array of multilayer antennas is 25 mm or less.

7. The RFID reader of claim 6, wherein an outer diameter of each antenna in the array of multilayer antennas is 12 mm or less.

8. The RFID reader of claim 1, wherein the array of multilayer antennas includes a strip of antennas including 10 antennas arranged in a 1×10 strip.

9. The RFID reader of claim 8, further comprising 9 additional 1×10 strips of antennas to form a 10×10 array, each of the 9 additional 1×10 strip of antennas having a separate electronics unit such that the 10 strips of antennas are operable in parallel.

10. The RFID reader of claim 9 wherein a centre-to-centre spacing of adjacent antennas is no more than 13 mm.

11. The RFID reader of claim 8, wherein the strip of antennas includes 13 antennas connected to one another in a 1×13 array.

12. The RFID reader of claim 11, further comprising 12 additional strips of antennas, each of the 12 additional strips of antennas having a separate electronics unit such that 13 strips of antennas are operable in parallel, the 13 strips of antennas including the strip of antennas and the 12 additional strips of antennas.

13. The RFID reader of claim 8, further comprising 3 additional strips of antennas to form a 4×10 array, each of the 3 additional strips of antennas having a separate electronics unit such that 4 strips of antennas are operable in parallel, the 4 strips of antennas including the strip of antennas and the 3 additional strips of antennas.

14. The RFID reader of claim 1, wherein a ratio between a diameter of the aerial and a centre-to-centre spacing of adjacent antennas is no more than 10-to-1.

15. The RFID reader of claim 1, further comprising a surface configured to receive a box of vials.

16. The RFID reader of claim 1 further comprising a box for storage of vials, the box having a plurality of divisions, at least some of the plurality of divisions containing vials.

17. An RFID reader comprising:
an array of antennas made up of a plurality of rows of antennas, each of the plurality of rows of antennas having its own electronics unit configured to transmit information to and receive and process information from each antenna in said row, wherein the electronic unit for each row in the plurality of rows is located at an opposite side of the array to the electronic unit for an adjacent row.

18. The RFID reader of claim 17, wherein an outer diameter of each antenna in the array of multilayer antennas is 25 mm or less.

19. An RFID reader comprising
an array of antennas made up of a plurality of rows of antennas, each of the plurality of rows of antennas having its own electronics unit configured to transmit information to and receive and process information from each antenna in said row, wherein each antenna in the array of antennas is a multilayer antenna comprising a first coil and a second coil, the first coil being superimposed above the second coil.

20. The RFID reader of claim 19, further comprising Radar Absorbent Material (RAM) located between the first coil and the second coil.

* * * * *